United States Patent
Ciubotariu (10) Patent No.: US 10,977,368 B1
(45) Date of Patent: Apr. 13, 2021

(54) DETECTING MALWARE BASED ON MEMORY ALLOCATION PATTERNS

(71) Applicant: CA, Inc., San Jose, CA (US)

(72) Inventor: Mircea Ciubotariu, Culver City, CA (US)

(73) Assignee: CA TECHNOLOGIES, INC., San Jose, CA (US)

(*) Notice: Subject to any disclaimer, the term of this patent is extended or adjusted under 35 U.S.C. 154(b) by 443 days.

(21) Appl. No.: 15/855,597

(22) Filed: Dec. 27, 2017

(51) Int. Cl.
  *G06F 21/56* (2013.01)
  *G06F 3/06* (2006.01)
  *G06F 21/55* (2013.01)

(52) U.S. Cl.
  CPC ............ *G06F 21/566* (2013.01); *G06F 3/067* (2013.01); *G06F 3/0623* (2013.01); *G06F 3/0631* (2013.01); *G06F 21/554* (2013.01); *G06F 2221/034* (2013.01)

(58) Field of Classification Search
  CPC ...... G06F 21/566; G06F 21/554; G06F 21/56; G06F 21/57; G06F 21/53; G06F 21/52; G06F 21/564; G06F 21/55; G06F 21/565; G06F 21/568; G06F 21/561; G06F 21/577; G06F 2221/034; G06F 2221/033
  See application file for complete search history.

(56) References Cited

U.S. PATENT DOCUMENTS

| | | | |
|---|---|---|---|
| 9,202,054 B1* | 12/2015 | Lu | G06F 21/566 |
| 9,348,742 B1* | 5/2016 | Brezinski | G06F 21/52 |
| 9,438,623 B1* | 9/2016 | Thioux | G06F 21/52 |
| 9,916,443 B1* | 3/2018 | Qu | G06F 21/554 |
| 9,973,531 B1* | 5/2018 | Thioux | H04L 63/1466 |
| 10,417,420 B2* | 9/2019 | Zhang | G06F 21/562 |
| 10,430,586 B1* | 10/2019 | Paithane | G06F 3/0653 |
| 2006/0095427 A1* | 5/2006 | Dickenson | G06F 12/023 |
| 2011/0185424 A1* | 7/2011 | Sallam | G06F 21/566 726/23 |
| 2013/0152200 A1* | 6/2013 | Alme | G06F 21/554 726/24 |
| 2014/0123283 A1* | 5/2014 | Liu | G06F 21/566 726/23 |
| 2015/0227742 A1* | 8/2015 | Pereira | G06F 21/56 726/24 |

(Continued)

*Primary Examiner* — Tae K Kim
(74) *Attorney, Agent, or Firm* — Shook, Hardy & Bacon L.L.P.

(57) ABSTRACT

A method for threat detection by identifying patterns of used memory blocks is described. In one embodiment, the method includes identifying a pattern of memory allocations from a known malware threat; tracking memory allocations of memory; identifying a plurality of memory allocations that match at least a portion of the pattern of memory allocations based at least in part on the tracking of the memory allocations; and performing a security action upon determining a quantity of the plurality of memory allocations satisfies a predetermined threshold. In some examples, the method includes determining that a sequence of wiped data strings satisfies a confidence threshold, and identifying the plurality of memory allocations is based at least in part on the confidence threshold. In some cases, the security action includes flagging the identified pattern of memory allocations, quarantining an associated application or process, or generating a notification.

20 Claims, 7 Drawing Sheets

(56) References Cited

U.S. PATENT DOCUMENTS

| | | | |
|---|---|---|---|
| 2016/0004861 A1* | 1/2016 | Momot | G06F 21/552 |
| | | | 726/23 |
| 2016/0259682 A1* | 9/2016 | Stark | G06F 11/1064 |
| 2017/0161498 A1* | 6/2017 | Yavo | G06F 21/566 |
| 2018/0211033 A1* | 7/2018 | Aditham | G06F 21/316 |
| 2018/0276372 A1* | 9/2018 | Crabtree | G06F 8/65 |
| 2018/0278647 A1* | 9/2018 | Gabaev | G06F 21/52 |
| 2019/0114421 A1* | 4/2019 | Das | G06F 21/566 |
| 2019/0347415 A1* | 11/2019 | Yavo | G06F 21/53 |
| 2020/0342100 A1* | 10/2020 | Goldstein | G06F 21/564 |

* cited by examiner

DETECTING MALWARE BASED ON MEMORY ALLOCATION PATTERNS

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as spyware, viruses, worms, Trojan horses, rootkits, keyloggers, ransomware, grayware, spyware, and the like. Malware programmers are continually adapting to the improvements made in malware detection, which creates an ongoing cycle of malware techniques adapting to improvements in malware detection. In some cases, a malware threat may request memory allocations to execute a malicious program. However, threat authors may be aware of the capabilities of modern emulators, and may overwrite, wipe, or otherwise hide their memory signatures by wiping out data strings after using them, making the content of the malicious program difficult to identify.

SUMMARY

According to at least one embodiment, a method for threat detection by identifying patterns of used memory blocks is described. In one embodiment, the method may include identifying a pattern of memory allocations from a known malware threat, tracking memory allocations of memory, identifying a plurality of memory allocations that match at least a portion of the pattern of memory allocations based at least in part on the tracking of the memory allocations, and performing a security action upon determining a quantity of the plurality of memory allocations satisfies a predetermined threshold.

In some embodiments, the method may include determining that a sequence of wiped data strings satisfies a confidence threshold. In some cases, identifying a plurality of memory allocations that match at least a portion of the pattern of memory allocations may be based at least in part on determining that the number of wiped data strings satisfies the confidence threshold. In some examples of the method, the pattern of memory allocations from a known malware threat comprises a sequence of allocation sizes.

In some embodiments, the method may include storing the pattern of memory allocations from a known malware threat. In some examples, the method may include comparing the plurality of memory allocations to the stored pattern of memory allocations. In some examples, identifying the plurality of memory allocations that match at least a portion of the pattern of memory allocations may be based at least in part on the comparing. In some embodiments, the identified plurality of memory allocations may include at least two consecutive memory allocations, forming a part of a sequence of memory allocations.

In some embodiments, performing the security action may include flagging the identified pattern of memory allocations. In some cases, flagging the identified pattern of memory allocations may include identifying the pattern of memory allocation as a potential malware threat.

In some embodiments, the method may include identifying an application or a process associated with the plurality of memory allocations, and quarantining the identified application or the identified process. In some examples, the method may include generating a notification indicating the identified application or the identified process as potential malware. In some examples, malware may include a virus, a worm, a Trojan horse, a rootkit, a keylogger, ransomware, grayware, or spyware, or any combination thereof. In some examples, the method may include identifying an abnormality in the identified pattern of memory allocations. In some examples, the abnormality may include a memory block from the identified pattern of memory allocations with one or more data strings overwritten with zeros, the memory block filled with random data, or binary code that is unreadable by the one or more computing devices, or any combination thereof. In some cases, the method may include increasing a confidence level that the identified application or the identified process is malware based at least in part on the identifying of the abnormality.

A computing device configured for threat detection by identifying patterns of used memory blocks is also described. The computing device may include one or more processors and memory in electronic communication with the one or more processors. The memory may store computer executable instructions that when executed by the one or more processors cause the one or more processors to perform the steps of identifying a pattern of memory allocations from a known malware threat, tracking memory allocations of memory, identifying a plurality of memory allocations that match at least a portion of the pattern of memory allocations based at least in part on the tracking of the memory allocations, and performing a security action upon determining a quantity of the plurality of memory allocations satisfies a predetermined threshold.

A computer-program product for threat detection by identifying patterns of used memory blocks is also described. The computer-program product may include a non-transitory computer-readable medium storing instructions thereon. When the instructions are executed by one or more processors, the execution of the instructions may cause the one or more processors to perform the steps of identifying a pattern of memory allocations from a known malware threat, tracking memory allocations of memory, identifying a plurality of memory allocations that match at least a portion of the pattern of memory allocations based at least in part on the tracking of the memory allocations, and performing a security action upon determining a quantity of the plurality of memory allocations satisfies a predetermined threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to a method of threat detection. More specifically, the systems and methods described herein relate to threat detection by identifying patterns of used memory blocks.

In some example, threat authors may be aware of the capabilities of some emulators. A malicious application (e.g., a Trojan horse, spyware, malware, etc.), may request memory allocation. In some cases, the malicious application may request allocations in heap memory. Alternatively, the malicious application may request allocations in stack memory. A malware threat may require a large number of encrypted data strings. For example, a malware threat associated with a particular malicious application may request a first data string having a first size (e.g., four bytes), a second data string having a second size (e.g., 15 bytes), and a third data string having a third size (e.g., 27 bytes). The malicious application may request a number of data strings of varying sizes (e.g., 4 data strings, 8 data strings, 12 data strings, and so on). The malicious application may allocate a buffer in the heap or stack and decrypt the data string. After executing the malicious application, the threat author may wipe each data string. For example, the threat author may overwrite the allocated data strings with zeros, random data, or binary code that is unreadable (e.g., garbage code). It may be difficult to identify threats based on memory signatures in such examples.

However, each allocated data string may have associated metadata that cannot be erased. That is, although a threat author may wipe or overwrite the allocated data strings after use, a threat author or malicious application cannot wipe the information regarding the size of each memory allocation. Allocated data strings utilized by the malicious application may not carry a threat signature. However, a malware threat may correspond to a particular pattern or sequence of allocation sizes.

In some examples, a first computing device may include a threat detection module, which may be in connection or co-located with a second computing device or in connection with or co-located with a server. The first computing device may read metadata related to each memory allocation from the first computing device, the second computing device, and/or the server. In some cases, the first computing device may identify a sequence of memory allocations for a malware threat. The first computing device may store the size of each subsequent memory allocation, and may compare the stored sequences of allocation sizes to the stored patterns of allocations made by known malware. That is, the first computing device may compare a sequence of memory allocation sizes with the sequence of memory allocation sizes that correspond to stored malware threat sequences of memory allocation sizes. If the first computing device detects a match between at least a portion of a current sequence of requested or allocated memory allocation sizes and the stored pattern of malware allocation sizes, the first computing device may identify a potential malware threat.

In some examples, the first computing device may determine whether a sequence of allocated memory sizes is a potential malware threat by determining whether a number of matching memory allocation sizes satisfies a threshold. For example, a predetermined threshold may be set at two or more matches, three or more, five or more, or ten or more, etc. In one embodiment, an administrator may select the threshold depending on the degree of certainty desired by the administrator. If the administrator sets the threshold higher, then malware detections may be made with a higher degree of certainty. If the administrator sets the threshold lower, then malware detections may be made with a lower degree of certainty.

In some examples, when a first computing device identifies a potential malware threat based on whether a number of matching memory allocation sizes satisfies the threshold, the first computing device may perform a security action. For example, the first computing device may flag the identified pattern of memory allocations. The first computing device may generate an indication that the identified pattern of memory allocation is a potential malware threat, or is linked to the previously stored malware threat. The first computing device may identify a malicious application or process that is associated with the pattern or sequence of memory allocations and may identify the application or process as a potential malware threat. In some cases, the first computing device may quarantine an identified application or process associated with the pattern of memory allocations, and may perform additional testing or verification on the process or application. The first computing device may generate a notification indicating that the identified process or application is a potential malware, such as a virus, a worm, a Trojan horse, a rootkit, a keylogger, ransomware, grayware, or spyware, or any combination thereof.

The first computing device may provide further confirmation that a potential malware is identified by identifying a series of zeros, random data, or binary code that is unreadable by the first computing device. Such garbage code or strings of zeros may indicate that a particular memory allocation or sequence of allocated memory sizes has been overwritten by a malicious application. Identifying such strings of zeros or garbage code may increase the likelihood that the tracked or identified memory allocations are associated with a malware threat.

Figure 1:
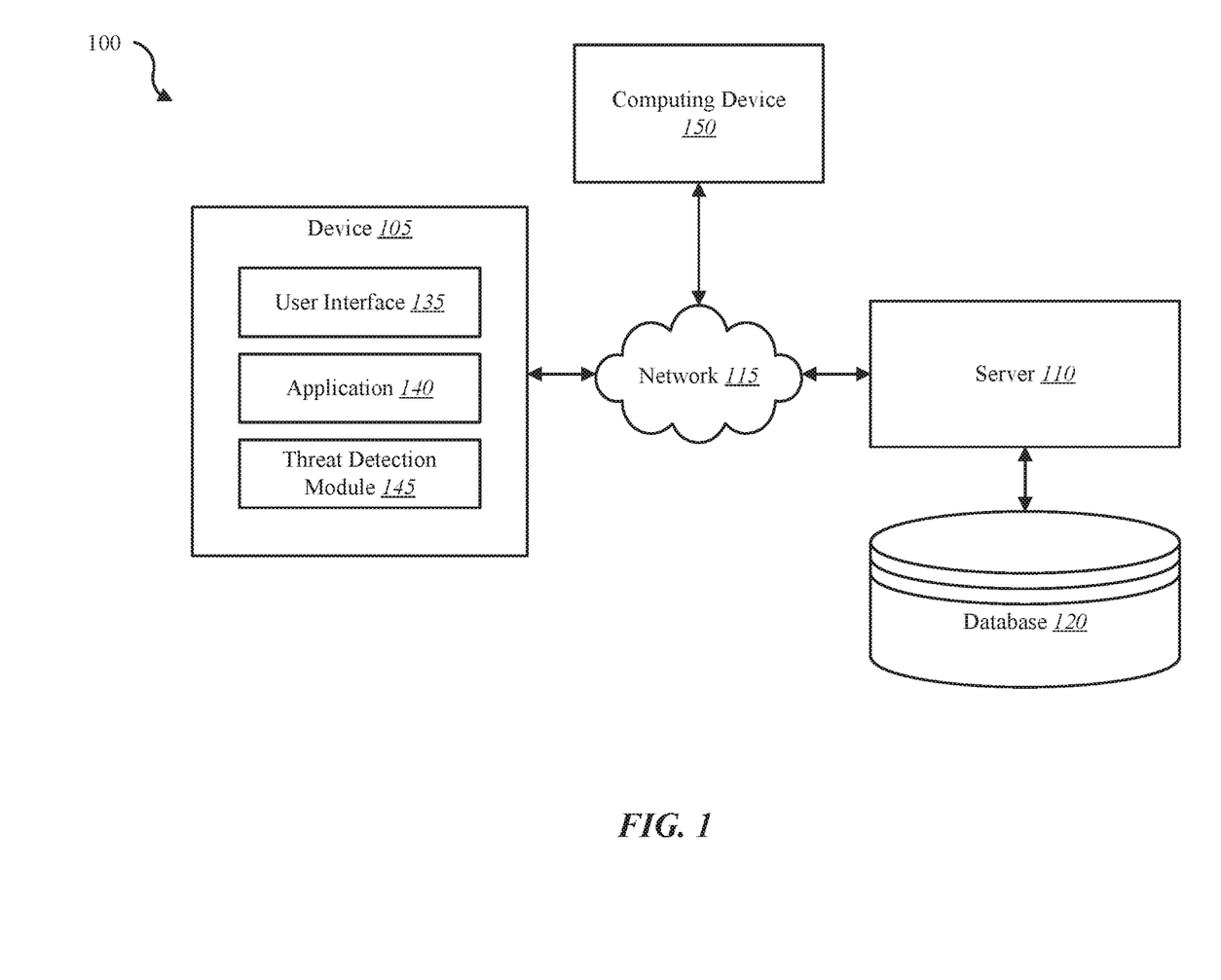
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a computing device 150, and a network 115 that allows the device 105, the server 110, the computing device 150, and to communicate with one another.

Examples of the device 105 may include any combination of mobile devices, smart phones, personal computing devices, computers, laptops, desktops, servers, media content set top boxes, digital video recorders (DVRs), or any combination thereof. In some cases, device 105 may include a building automation controller integrated within device 105, or as depicted, may be in communication with an automation controller via network 115.

Examples of computing device 150 may include one or more devices comprising one or more hardware processors. For example, computing device 150 may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. Although computing device 150 is depicted as connecting to device 105 via network 115, in one embodiment, device 105 may connect directly to computing device 150. In some cases, device 105 may connect or attach to computing device 150 and/or server 110 via a wired and/or wireless connection. In some cases, device 105 may attach to any combination of a port, socket, and slot of computing device 150 and/or server 110.

In some configurations, the device 105 may include a user interface 135, application 140, and threat detection module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, threat detection module 145, computing device 150, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include threat detection module 145. For example, device 105 may include application 140 that allows device 105 to interface with a separate device via threat detection module 145 located on another device such as computing device 150 and/or server 110. In some embodiments, device 105, computing device 150, and server 110 may include threat detection module 145 where at least a portion of the functions of threat detection module 145 are performed separately and/or concurrently on device 105, computing device 150, and/or server 110. Likewise, in some embodiments, a user may access the functions of device 105 (directly or through device 105 via threat detection module 145) from computing device 150. For example, in some embodiments, computing device 150 includes a mobile application that interfaces with one or more functions of device 105, threat detection module 145, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly to computing 150 and/or one or more network devices such as a gateway, switch, router, intrusion detection system, etc.

Threat detection module 145 may enable a computing device (e.g., device 105, computing device 150, and/or server 110) to identify malicious patterns of used memory blocks. In one embodiment, threat detection module 145 in device 105 may detect malicious patterns of used memory blocks in device 105, detect malicious patterns of used memory blocks in computing device 150, or detect malicious patterns of used memory blocks in server 110, or detect malicious patterns of used memory blocks in any combination of device 105, computing device 150, and server 110. In some embodiments, threat detection module 145 may be configured to perform the systems and methods described herein in conjunction with user interface 135 and application 140. User interface 135 may enable a user to interact with, control, and/or program one or more functions of threat detection module 145. Further details regarding the threat detection module 145 are discussed below.

Figure 2:
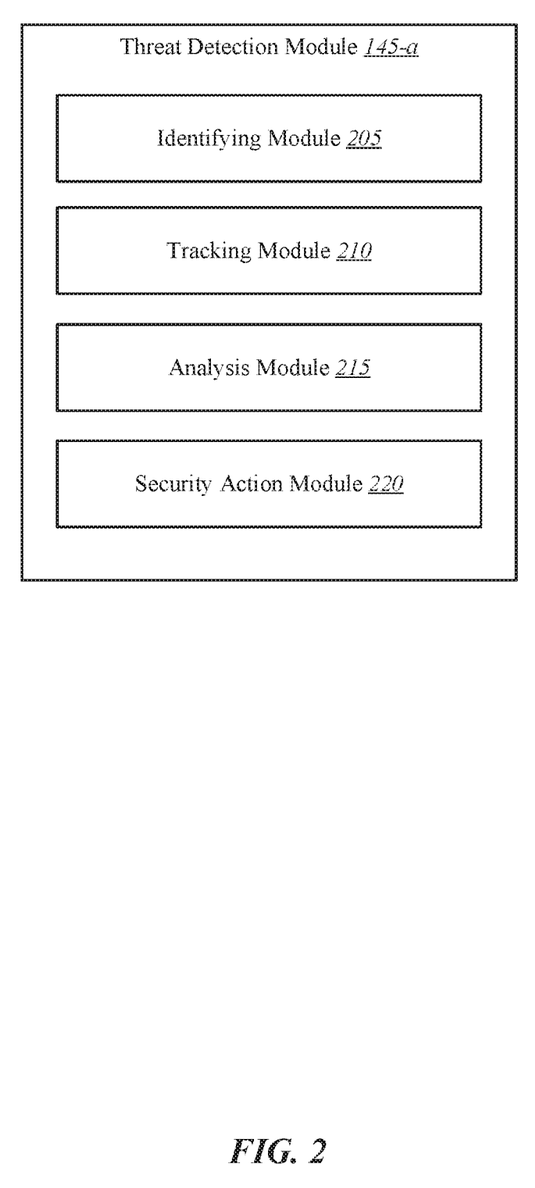
FIG. 2 is a block diagram illustrating one example of one or more modules in accordance with various aspects of this disclosure.

FIG. 2 is a block diagram illustrating one example of threat detection module 145-*a*. Threat detection module 145-*a* may be one example of threat detection module 145 depicted in FIG. 1. As depicted, threat detection module 145-*a* may include an identifying module 205, a tracking module 210, an analysis module 215, and a security action module 220.

In one embodiment, identifying module 205 may identify a pattern of memory allocations from a known malware threat. The identification may be made based on prior detections of suspicions patterns or activities, or may be predetermined or known to a device or to the network. The known malware threat may be a virus, a worm, a Trojan horse, a rootkit, a keylogger, ransomware, grayware, or spyware, or any combination thereof. The pattern of memory allocations from a known malware threat may comprise a sequence of allocations sizes. For example, identifying module 205 may analyze the memory allocation patterns of a known malware threat. Identifying module 205 may determine that the known malware threat makes a sequence of memory allocations of a certain size. For example, identifying module 205 may determine that the known malware threat makes a first allocation of a first size (e.g., 8 bytes), makes a second allocation of a second size (e.g., 32 bytes), makes a third data string of a third size (e.g., 16 bytes), and makes a fourth allocation of a fourth size (e.g., 8 bytes), etc. The identifying module 205 may identify this sequence of memory allocations as a pattern of memory allocations made by the malware threat. Identifying module 205 may then store the detected pattern for future analysis of memory allocations made by unknown malware threats and/or potential malware threats.

In some examples, a malicious application, such as the malware threat identified by identifying module 205, may make one or more allocations of memory for execution of a malware threat. However, a threat author may avoid detection of the malicious application by wiping each allocated data string after use. For example, the threat author may overwrite the allocated data strings with zeros, random data, or binary code that is unreadable by threat detection module 145-*b* (e.g., garbage code). In such cases, a threat detection module 145-*a* may be unable to read a potential threat signature in the allocated memory. However, threat authors cannot erase, overwrite, or wipe meta data, such as memory allocation sizes. Such metadata is therefore trackable.

Tracking module 210 may track memory allocations of memory. In some examples, tracking module 210 may store the pattern of memory allocations from a known malware threat. Storing the pattern may allow for a comparison between newly detected allocation patterns and the identified pattern of memory allocations corresponding to the known malware threat. Tracking module 210 may monitor or track each memory allocation of one or multiple applications. Different applications may allocate data strings of varying sizes and varying orders. Tracking module 210 may monitor the size and sequence of memory allocations.

Analysis module 215 may identify a plurality of memory allocations by the computing device to which the threat detection module is associated that match at least a portion of the pattern of memory allocations of the known malware threat detected by the tracking module 210. For example, similar to the sequence of memory allocation sizes made by a known malware threat, a current application may request an allocation of a first data string having a first size (e.g., 4 bytes), an allocation of a second data string having a second size (e.g., 15 bytes), and an allocation of a third data string having a third size (e.g., 27 bytes). In such examples, analysis module 215 may determine that the sequence of memory allocation sizes of a current application is the same or partially the same as the sequence of memory allocations associated with the known malware threat.

In some cases, analysis module 215 may compare the plurality of memory allocations to the stored pattern of memory allocations. In such cases, identifying the plurality of memory allocations that match at least a portion of the pattern of memory allocations is based at least in part on the comparing. The identified plurality of memory allocations may comprise at least two consecutive memory allocations, forming a part of a sequence or pattern of memory allocations. In some examples, analysis module 215 may identify an abnormality in the identified pattern of memory allocations. The abnormality may include a memory block from the identified pattern of memory allocations with one or more data strings overwritten with zeros, the memory block filled with random data, or binary code that is unreadable by a computing device, or any combination thereof. Analysis module 215 may generate a confidence level that the identified application or the identified process is malware based at least in part on the identifying of the abnormality. For example, when a comparison indicates an exact match, analysis module 215 may indicate a relatively high confidence level, but when a comparison indicates a partial match, analysis module 215 may indicate a confidence level based on the degree of the partial match.

In some examples, identifying the plurality of memory allocations that match at least a portion of the pattern of memory allocations may be based at least in part on determining that the number of matching allocations satisfies a confidence threshold. For example, analysis module 215 may determine the number of allocations of a monitored sequence of allocations that match a given pattern of malware allocations. For instance, as a non-limiting example, a confidence threshold may be set at 8 matching allocations. In the example, analysis module 215 tracks 10 memory allocations from a current application, but determines only 7 of the 10 memory allocations have sizes that match the pattern memory allocation sizes of the known malware threat. Thus, analysis module 215 may refrain from identifying the current application as a potential malware threat because the confidence threshold remains unsatisfied. However, if eight or more of the ten memory allocation sizes match the sequence of memory allocation sizes of the known malware threat, then analysis module 215 may determine that the confidence threshold is satisfied and that the current application is a potential malware threat. For example, the pattern of malware allocations may include a first allocation of 8 bytes, a second allocation of 16 bytes, a third allocation of 4 bytes, a fourth allocation of 32 bytes, and a fifth allocation of 20 bytes, etc. The monitored sequence of allocations by a current application may include a first allocation of 8 bytes (a first match), a second allocation of 16 bytes (a second match), a third allocation of 8 bytes (a mismatch), a fourth allocation of 32 bytes (a third match), and a fifth allocation of 20 bytes (a fourth match). Thus, with the confidence threshold set at 4 or more matches (as one example), analysis module 215 may identify the current application as potential malware.

In one example, a confidence threshold may be set at 5 consecutive matching allocation sizes. In the example, analysis module 215 tracks 10 memory allocations from a current application, and determines that 5 of the 10 memory allocations have sizes that match the pattern memory allocation sizes of the known malware threat. However, the 5 matches may be non-consecutive matches. For example, the pattern of malware allocations may be {8 bytes, 16 bytes, 4 bytes, 32 bytes, 20 bytes, 12 bytes, 8 bytes, 24 bytes, 4 bytes, 16 bytes}. The sizes of the allocations made by the current application may be {5 bytes, 16 bytes, 10 bytes, 25 bytes, 20 bytes, 17 bytes, 8 bytes, 24 bytes, 4 bytes, 15 bytes}. Thus, the sizes of the allocations of the current application may match 5 of the sizes of the pattern of malware allocations (as indicated by the underlined matches), but not 5 consecutive matches. Accordingly, the sizes of the allocations made by the current application may fail to satisfy the confidence threshold of 5 consecutive matching allocation sizes. Conversely, if the sizes of the allocations made by the current application were {5 bytes, 16 bytes, 4 bytes, 32 bytes, 20 bytes, 12 bytes, 22 bytes, 15 bytes, 18 bytes, 15 bytes}, then the 5 consecutive matches would satisfy the confidence threshold.

Security action module 220 may perform a security action upon determining a quantity of the plurality of memory allocations satisfies the confidence threshold. In some examples, the security action may include flagging the identified pattern of memory allocations. For example, security action module 220 may flag the identified pattern of memory allocations by identifying the pattern of memory allocation as a potential malware threat. Security action module 220 may identify an application or a process associated with the plurality of memory allocations, and may quarantine the identified application or the identified process. In some examples, security action module 220 may also generate a notification indicating the identified application or the identified process as potential malware, and the potential malware may include a virus, a worm, a Trojan horse, a rootkit, a keylogger, ransomware, grayware, or spyware, or any combination thereof. In some examples, security action module 220 may execute a forced stop of the malicious application. In some cases, security action module 220 may remove or uninstall the malicious application from the affected system. In some examples, security action module 220 may scan the malicious application. In some cases, security action module 220 may determine a source of the application (e.g., a website, email address, text message contact information, etc.)

Figure 3:
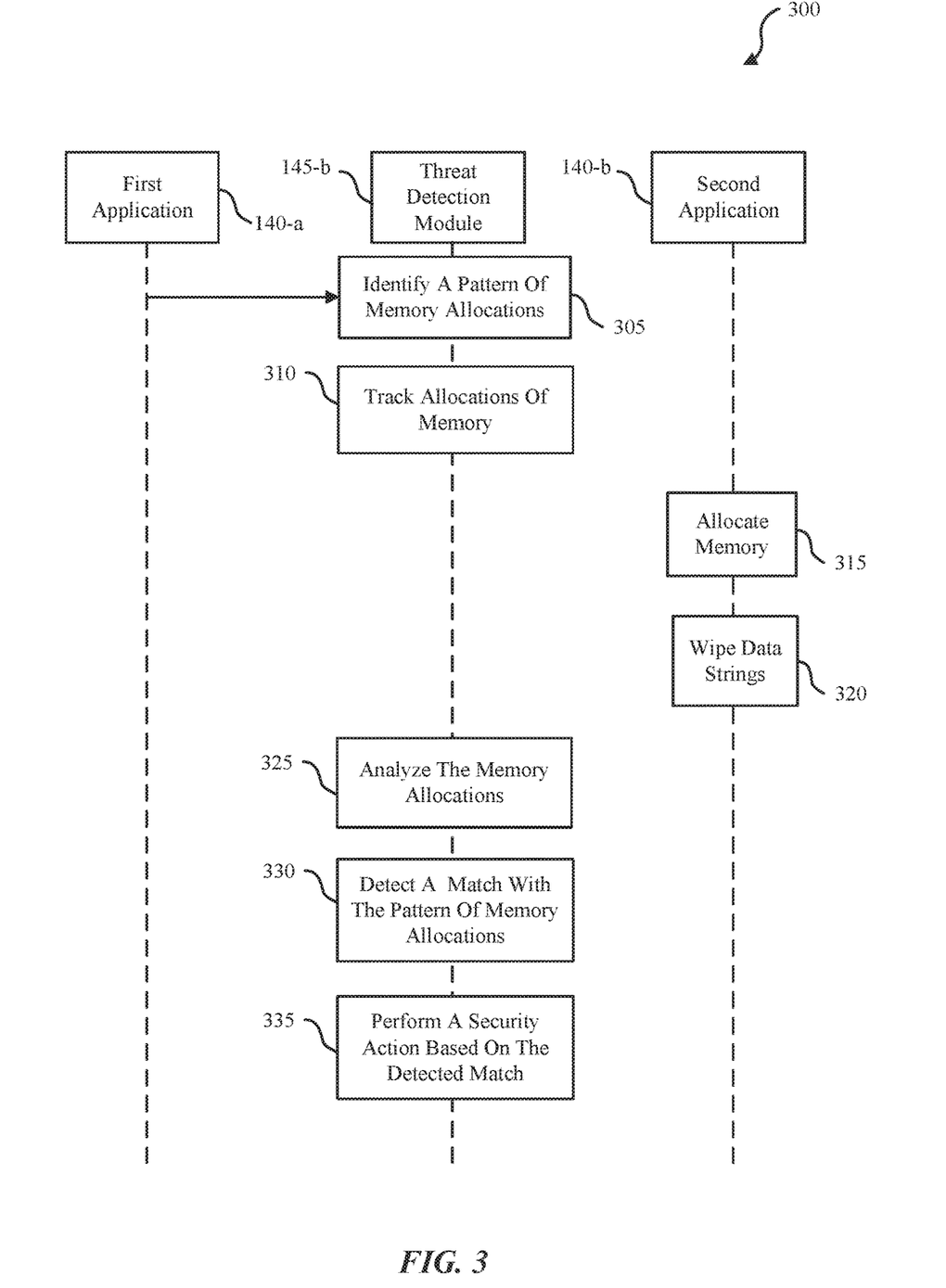
FIG. 3 is a block diagram of a data flow in accordance with various aspects of this disclosure.

FIG. 3 is a block diagram of a data flow illustrating one embodiment of a method 300 for threat detection by identifying patterns of used memory blocks. In some configurations, the method 300 may be implemented by the threat detection module 145 illustrated in FIGS. 1 and/or 2. In some configurations, the data flow 300 may be implemented in conjunction with one or more computing devices such as device 105, server 110, network 115, database 120, components thereof, or any combination thereof, from FIGS. 1 and/or 2. As illustrated, threat detection module 145-*b* may be configured to monitor memory allocations associated with a first application 140-*a* and/or a second application 140-*b*. First application 140-*a* and/or second application 140-*b* may be examples of application 140 of FIG. 1. In one embodiment, first application 140-*a* and second application 140-*b* may be installed on the same computing device (e.g., device 105, computing device 150, and/or server 110). Alternatively, first application 140-*a* may be installed on a first computing device (e.g., device 105) and second application 140-*b* may be installed on a second computing device different from the first computing device (e.g., computing device 150 or server 110).

In one embodiment, threat detection module 145-*b* may determine that first application 140-*a* is malware or contains malware such as a virus, a worm, a Trojan horse, a rootkit, a keylogger, ransomware, grayware, or spyware, or any combination thereof. Accordingly, at block 305 threat detection module 145-*b* may identify a pattern of memory allocations associated with first application 140-*a*. The pattern of memory allocations may include a sequence of memory allocation sizes made by one or more processes of first application 140-*a*. The identified pattern may be useful to threat detection module 145-*b* because, as discussed in greater detail below, first application 140-*a* may overwrite or wipe its signature from requested and utilized data strings in an attempt to cover its malware tracks. However, metadata, such as the size of each memory allocation, cannot be wiped by first application 140-*a*. Thus, at block 305, threat detection module 145-*b* may identify the sequence of memory allocations made by first application 140-*a* as a pattern of malware memory allocations, and may store the pattern of malware memory allocations for subsequent comparisons.

At block 310, threat detection module 145-*b* may track memory allocations of memory made by a computing device. Various applications or processes, such as malicious applications and/or non-malicious applications may request memory allocations. Regardless of the contents of the memory allocations, threat detection module 145-*b* may track and identify the size of each memory allocation in a sequence of memory allocations, and may compare the sequence of memory allocation sizes to the identified pattern of malware memory allocations. In some cases, threat detection module 145-*b* may read metadata related to each memory allocation made by the computing device to which threat detection module 145-*b* is associated. made by a second application 140-*b*.

At block 315 second application 140-*b* may allocate memory. At block 320, second application 140-*b* may wipe the original data in the memory allocations made at block 315. For example, the threat author may overwrite the allocated data strings with zeros, random data, or binary code that is unreadable by threat detection module 145-*b* (e.g., garbage code).

At block 325, threat detection module 145-*b* may analyze the memory allocation of block 315. Although second application 140-*b* may wipe or overwrite the allocated data strings after use, a threat author or second application 140-*b* cannot wipe the metadata regarding the size of each memory allocation. Thus, although allocated data strings utilized by second application 140-*b* may not carry a threat signature, the allocations made by second application 140-*b* may correspond to a particular pattern or sequence of size allocations such as the pattern of malware memory allocations identified at block 305. For example, similar to the sequence of memory allocation sizes made by the first application 140-*a*, second application 140-*b* may request an allocation of a first data string having a first size (e.g., 4 bytes), an allocation of a second data string having a second size (e.g., 15 bytes), and an allocation of a third data string having a third size (e.g., 27 bytes), etc.

In some examples, threat detection module 145-*b* may provide further confirmation that a sequence of memory allocations made by second application 140-*b* represents a potential malware threat by identifying a series of zeros, random data, or binary code that is unreadable in the memory space allocated by second application 140-*b*. Such garbage code or strings of zeros in a sequence of memory allocations may indicate that a particular memory allocation or sequence of allocated memory sizes has been overwritten by a malicious application. Identifying such strings of zeros or garbage code may increase the likelihood that second application 140-*b* is associated with the known malware threat.

At block 330, threat detection module 145-*b* may detect a match to the identified pattern of malware memory allocations identified at block 305. In some examples, threat detection module 145-*b* may determine whether a sequence of allocated memory sizes is a potential malware threat by determining whether the number of matching memory allocation sizes in a particular order satisfies a confidence threshold. For example, the confidence threshold may be set at two or more matches, three or more, five or more, or ten or more, etc. In some cases, threat detection module 145-*b* may identify at least two consecutive memory allocation sizes in the allocations made by second application 140-*b* that match at least two consecutive memory allocations of the pattern of malware memory allocations identified at block 305. For instance, the confidence threshold may be set at two or more consecutive matches, three or more consecutive matches, five or more consecutive matches, ten or more consecutive matches, etc. In some cases, consecutive matches may indicate a higher likelihood of the application being malicious than non-consecutive matches may indicate. In one embodiment, an administrator or server 110 may select the confidence threshold depending on the degree of certainty desired by the administrator. In one example, the confidence threshold may be set to 10 or more matches for a relatively high degree of certainty, or may be set to less than 10 matches for a relatively low degree of certainty.

At block 335, threat detection module 145-*b* may perform a security action based on the detected match of block 330. For example, threat detection module 145-*b* may flag the identified pattern of memory allocations. Threat detection module 145-*b* may generate an indication that the identified pattern of memory allocation is a potential malware threat, or is linked to the previously stored malware threat. Threat detection module 145-*b* may identify a malicious application or process that is associated with the pattern or sequence of memory allocations and may identify the second application 140-*b* or process as a potential malware threat. In some cases, threat detection module 145-*b* may quarantine an identified application or process associated with the pattern of memory allocations, and may perform additional testing or verification on the process or application. Threat detection module 145-*b* may generate a notification indicating that the identified process or application is a potential malware, such as a virus, a worm, a Trojan horse, a rootkit, a keylogger, ransomware, grayware, or spyware, or any combination thereof.

Figure 4:
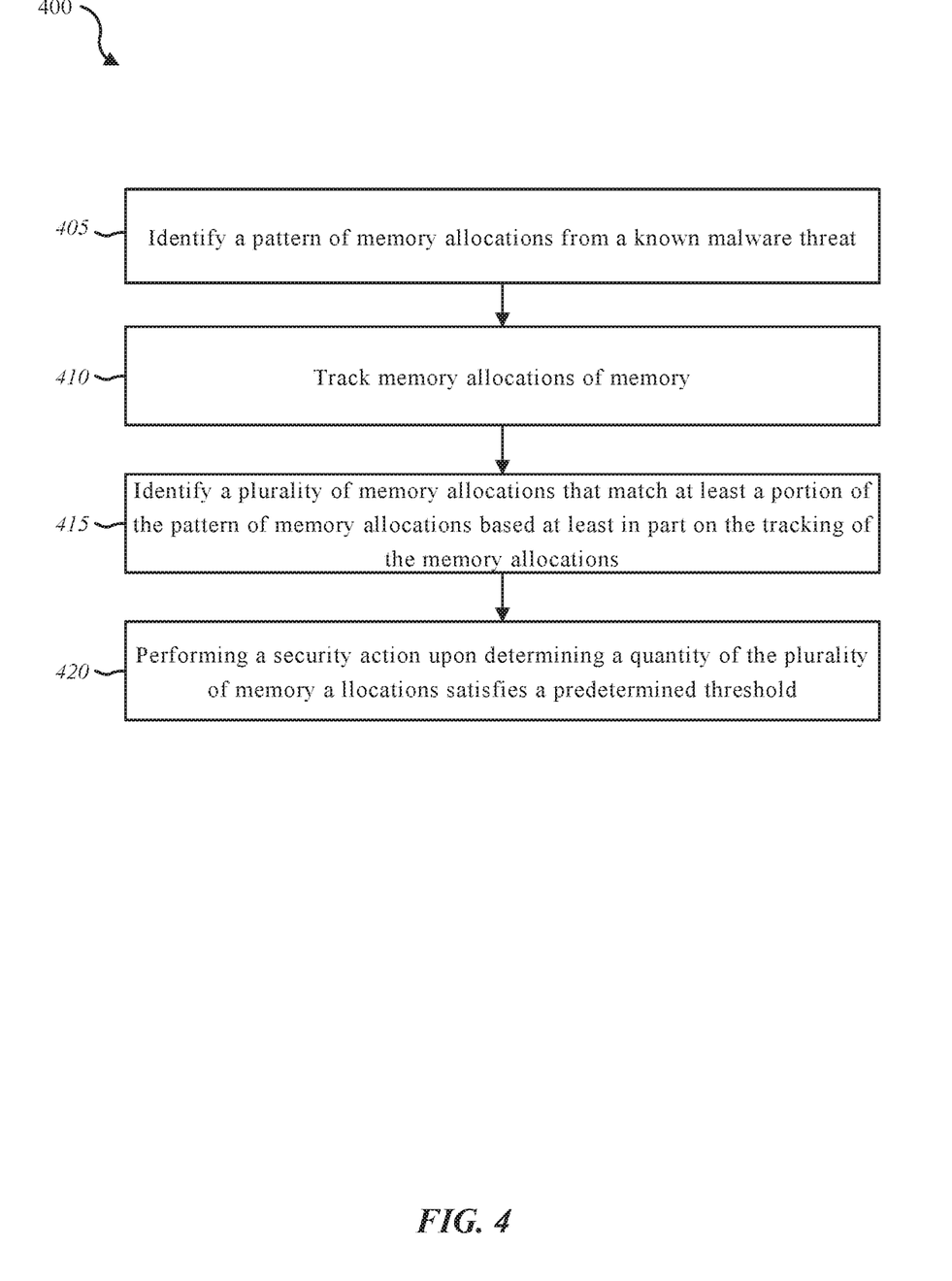
FIG. 4 is a flow diagram illustrating one embodiment of a method in accordance with various aspects of this disclosure.

FIG. 4 is a flow diagram illustrating one embodiment of a method 400 for threat detection by identifying patterns of used memory blocks. In some configurations, the method 400 may be implemented by the threat detection module 145 illustrated in FIGS. 1, 2, and/or 3. In some configurations, the method 400 may be implemented in conjunction with device 105, server 110, network 115, database 120, components thereof, or any combination thereof.

At block 405, the threat detection module 145 may identify a pattern of memory allocations from a known malware threat. The operations of block 405 may be performed according to the methods described herein. In certain examples, aspects of the operations of block 405 may be performed by an identifying module as described with reference to FIG. 2.

At block 410, the threat detection module 145 may track memory allocations of memory. The operations of block 410 may be performed according to the methods described herein. In certain examples, aspects of the operations of block 410 may be performed by a tracking module as described with reference to FIG. 2.

At block 415, the threat detection module 145 may identify a plurality of memory allocations that match at least a portion of the pattern of memory allocations based at least in part on the tracking of the memory allocations. The operations of block 415 may be performed according to the methods described herein. In certain examples, aspects of the operations of block 415 may be performed by an analysis module as described with reference to FIG. 2.

At block 420, the threat detection module 145 may perform a security action upon determining a quantity of the plurality of memory allocations satisfies a predetermined threshold. The operations of block 420 may be performed according to the methods described herein. In certain examples, aspects of the operations of block 420 may be performed by a security action module as described with reference to FIG. 2.

Figure 5:
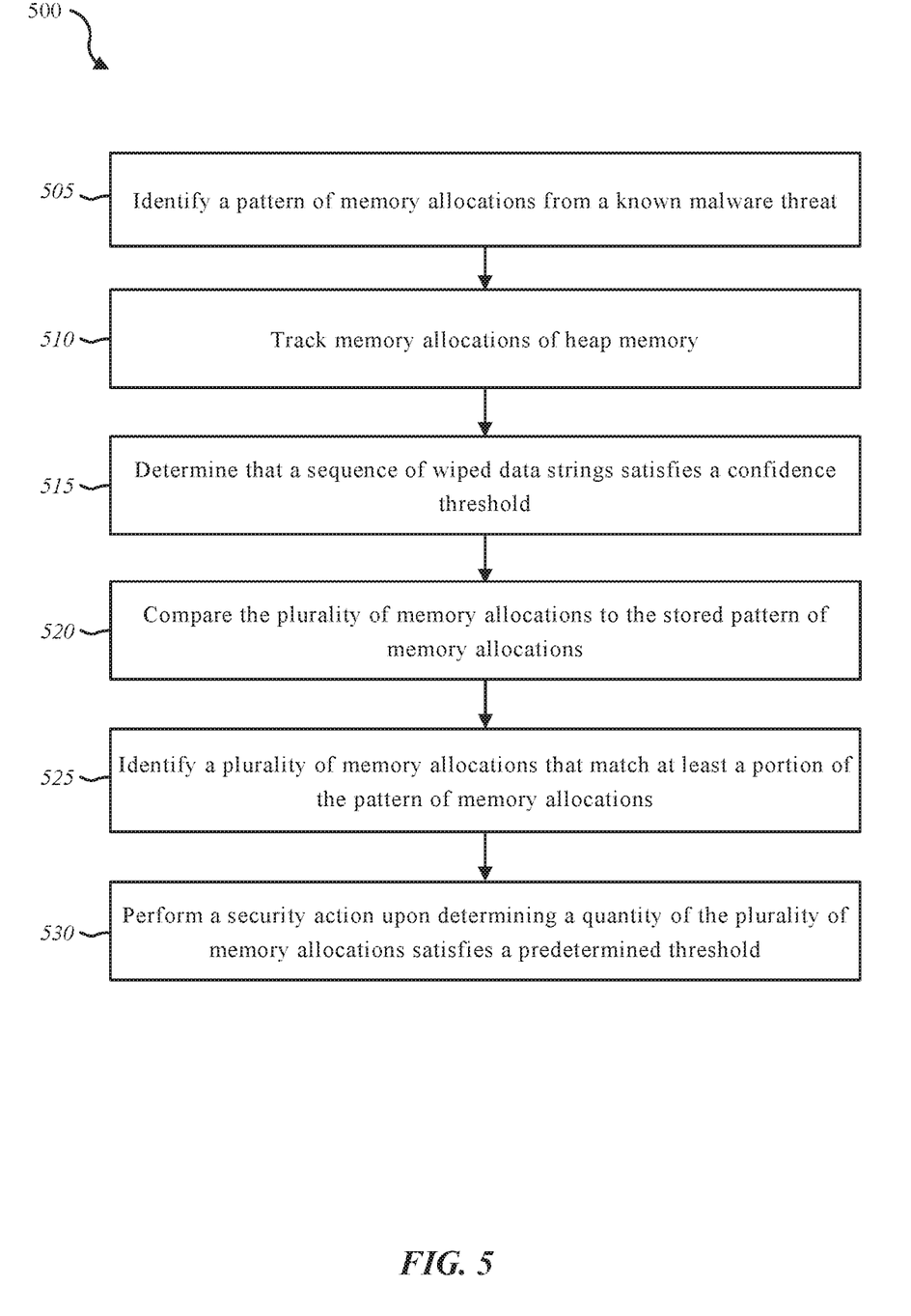
FIG. 5 is a flow diagram illustrating one embodiment of a method in accordance with various aspects of this disclosure.

FIG. 5 is a flow diagram illustrating one embodiment of a method 500 for threat detection by identifying patterns of used memory blocks. In some configurations, the method 500 may be implemented by the threat detection module 145 illustrated in FIG. 1 or 2. In some configurations, the method 500 may be implemented in conjunction with device 105, server 110, network 115, database 120, components thereof, or any combination thereof.

At block 505, the threat detection module 145 may identify a pattern of memory allocations from a known malware threat. The operations of block 505 may be performed according to the methods described herein. In certain examples, aspects of the operations of block 505 may be performed by an identifying module as described with reference to FIG. 2.

At block 510, the threat detection module 145 may track memory allocations of memory. The operations of block 510 may be performed according to the methods described herein. In certain examples, aspects of the operations of block 510 may be performed by a tracking module as described with reference to FIG. 2.

At block 515, the threat detection module 145 may determine that a sequence of wiped data strings satisfies a confidence threshold. The operations of block 515 may be performed according to the methods described herein. In certain examples, aspects of the operations of block 515 may be performed by an analysis module as described with reference to FIG. 2.

At block 520, the threat detection module 145 may compare the plurality of memory allocations to the stored pattern of memory allocations. The operations of block 520 may be performed according to the methods described herein. In certain examples, aspects of the operations of block 520 may be performed by an analysis module as described with reference to FIG. 2.

At block 525, the threat detection module 145 may identify a plurality of memory allocations that match at least a portion of the pattern of memory allocations. In some cases, detection module 145 may identify a match based at least in part on the tracking of the memory allocations, based at least in part on determining that the number of wiped data strings satisfies the confidence threshold, and/or based at least in part on the comparing indicating a match. The operations of block 525 may be performed according to the methods described herein. In certain examples, aspects of the operations of block 525 may be performed by an analysis module as described with reference to FIG. 2.

At block 530, the threat detection module 145 may perform a security action upon determining a quantity of the plurality of memory allocations satisfies a predetermined threshold. The operations of block 525 may be performed according to the methods described herein. In certain examples, aspects of the operations of block 525 may be performed by an security action module as described with reference to FIG. 2.

Figure 6:
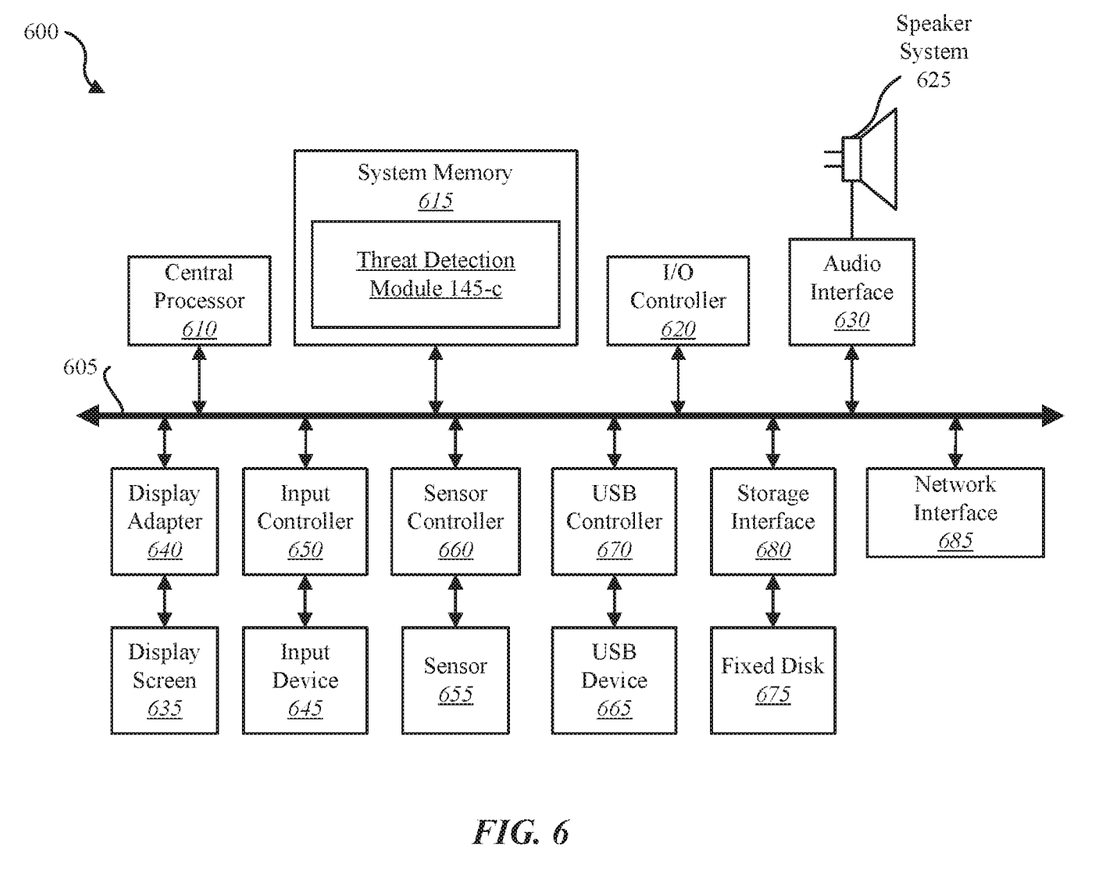
FIG. 6 depicts a block diagram of a computer system suitable for implementing the present systems and methods.

FIG. 6 depicts a block diagram of a computing device 600 suitable for implementing the present systems and methods. The device 600 may be an example of device 105, computing device 150, and/or server 110 illustrated in FIG. 1. In one configuration, device 600 includes a bus 605 which interconnects major subsystems of device 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the threat detection module 145-c to implement the present systems and methods may be stored within the system memory 615. Applications (e.g., application 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 600 wirelessly via network interface 685.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 600 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 685 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 620 may operate in conjunction with network interface 685 and/or storage interface 680. The network interface 685 may enable system 600 with the ability to communicate with client devices (e.g., device 105 of FIG. 1), and/or other devices over the network 115 of FIG. 1. Network interface 685 may provide wired and/or wireless network connections. In some cases, network interface 685 may include an Ethernet adapter or Fibre Channel adapter. Storage interface 680 may enable system 600 to access one or more data storage devices. The one or more data storage devices may include two or more data tiers each. The storage interface 680 may include one or more of an Ethernet adapter, a Fibre Channel adapter, Fibre Channel Protocol (FCP) adapter, a SCSI adapter, and iSCSI protocol adapter.

Figure 7:
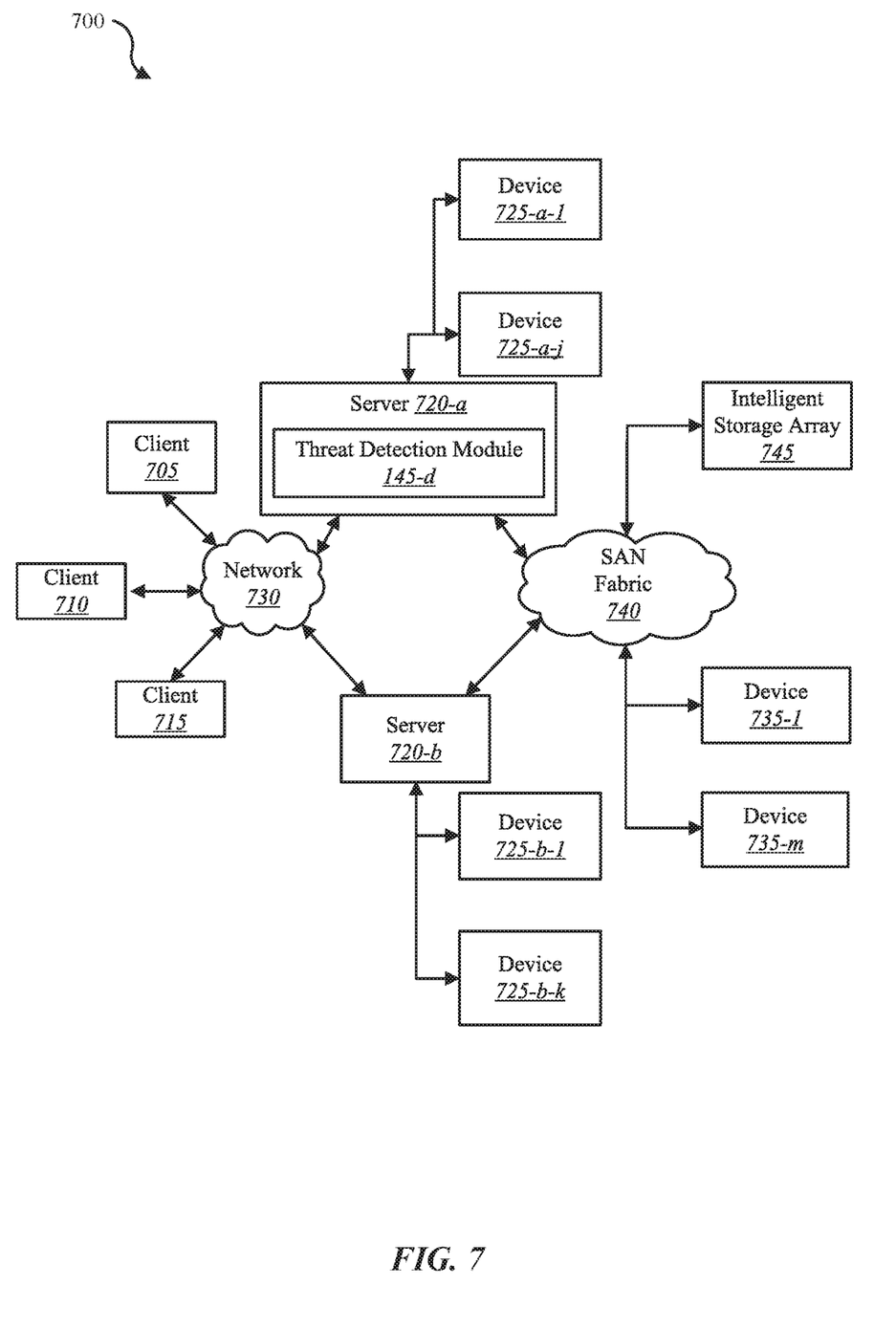
FIG. 7 depicts a block diagram of a computer system suitable for implementing the present systems and methods.

FIG. 7 is a block diagram depicting a network architecture 700 in which client systems 705, 710 and 715, as well as storage servers 720-a and 720-b (any of which can be implemented using computer system 600), are coupled to a network 730. In one embodiment, threat detection module 145-d may be located within one of the storage servers 720-a, 720-b to implement the present systems and methods. Threat detection module 145-d may be one example of threat detection module 145 depicted in FIGS. 1, 2, and/or 6. The storage server 720-a is further depicted as having storage devices 725-a-1 through 725-a-j directly attached, and storage server 720-b is depicted with storage devices 725-b-1 through 725-b-k directly attached. SAN fabric 740 supports access to storage devices 735-1 through 735-m by storage servers 720-a and 720-b, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-a or 720-b using, for example, a web browser or other client software (not shown). Such a client allows client systems 705, 710 and 715 to access data hosted by storage server 720-a or 720-b or one of storage devices 725-a-1 to 725-a-j, 725-b-1 to 725-b-k, 735-1 to 735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for malware threat detection, at least a portion of the method being performed by one or computing devices comprising at least one processor, the method comprising:
    identifying a pattern of memory allocations from a known malware threat, wherein the pattern comprises a sequential ordering of memory allocation sizes;
    tracking memory allocations of memory;
    identifying a plurality of memory allocations that match at least a portion of the pattern of memory allocations based at least in part on the tracking of the memory allocations, wherein sizes and an order of the plurality of memory allocations match at least a portion of the sequential ordering of memory allocation sizes in the pattern;
    determining whether a memory allocation from the plurality of memory allocations comprises binary code unreadable by one or more computing devices; and
    performing a security action upon determining a quantity of the plurality of memory allocations satisfies a predetermined threshold and determining the memory allocation from the plurality of memory allocations comprises binary code unreadable by one or more computing devices.

2. The method of claim 1, further comprising:
    determining that a sequence of wiped data strings satisfies a confidence threshold, wherein identifying a plurality of memory allocations that match at least a portion of the pattern of memory allocations is based at least in part on determining that the number of wiped data strings satisfies the confidence threshold.

3. The method of claim 1, further comprising:
    storing the pattern of memory allocations from a known malware threat.

4. The method of claim 3, further comprising:
    comparing the plurality of memory allocations to the stored pattern of memory allocations, wherein identifying the plurality of memory allocations that match at least a portion of the pattern of memory allocations is based at least in part on the comparing.

5. The method of claim 1, wherein the identified plurality of memory allocations comprise at least two consecutive memory allocations, forming a part of a sequence of memory allocations.

6. The method of claim 1, wherein performing the security action further comprises:
    flagging the identified pattern of memory allocations, wherein flagging the identified pattern of memory allocations comprises identifying the pattern of memory allocations as a potential malware threat.

7. The method of claim 1, wherein performing the security action further comprises:
    identifying an application or a process associated with the plurality of memory allocations; and
    quarantining the identified application or the identified process.

8. The method of claim 7, further comprising:
    generating a notification indicating the identified application or the identified process as potential malware, wherein malware includes a virus, a worm, a Trojan horse, a rootkit, a keylogger, ransomware, grayware, or spyware, or any combination thereof.

9. The method of claim 7, further comprising:
    identifying an abnormality includes a memory block from the identified pattern of memory allocations with one or more data strings overwritten with zeros, or the memory block filled with random data, or any combination thereof; and
    increasing a confidence level that the identified application or the identified process is malware based at least in part on the identifying of the abnormality.

10. The method of claim 1, wherein tracking memory allocations further comprises tracking a sequential ordering of memory allocations of an application.

11. A computing device configured for malware threat detection, comprising:
    a processor;
    memory in electronic communication with the processor;

instructions stored in the memory, the instructions being executable by the processor to:

identify a pattern of memory allocations from a known malware threat, wherein the pattern comprises a sequential ordering of memory allocation sizes;

track memory allocations of memory;

identify a plurality of memory allocations that match at least a portion of the pattern of memory allocations based at least in part on the tracking of the memory allocations, wherein sizes and an order of the plurality of memory allocations match at least a portion of the sequential ordering of memory allocation sizes in the pattern;

determine whether a memory allocation from the plurality of memory allocations comprises binary code unreadable by one or more computing devices; and perform a security action upon determining a quantity of the plurality of memory allocations satisfies a predetermined threshold and determining the memory allocation from the plurality of memory allocations comprises binary code unreadable by one or more computing devices.

12. The computing device of claim 11, wherein the instructions are executable by the processor to:

determine that a sequence of wiped data strings satisfies a confidence threshold, wherein identifying a plurality of memory allocations that match at least a portion of the pattern of memory allocations is based at least in part on determining that the number of wiped data strings satisfies the confidence threshold.

13. The computing device of claim 11, wherein the instructions are executable by the processor to:

store the pattern of memory allocations from a known malware threat.

14. The computing device of claim 13, wherein the instructions are executable by the processor to:

compare the plurality of memory allocations to the stored pattern of memory allocations, wherein identifying the plurality of memory allocations that match at least a portion of the pattern of memory allocations is based at least in part on the comparing.

15. The computing device of claim 11, wherein the identified plurality of memory allocations comprise at least two consecutive memory allocations, forming a part of a sequence of memory allocations.

16. The computing device of claim 11, wherein the instructions are executable by the processor to:

flag the identified pattern of memory allocations, wherein flagging the identified pattern of memory allocations comprises identifying the pattern of memory allocations as a potential malware threat.

17. The computing device of claim 11, wherein performing the security action further comprises:

identifying an application or a process associated with the plurality of memory allocations; and quarantining the identified application or the identified process.

18. A computer-program product for malware threat detection, the computer-program product comprising a non-transitory computer-readable medium storing instructions thereon, the instructions being executable by a processor to:

identify a pattern of memory allocations from a known malware threat, wherein the pattern comprises a sequential ordering of memory allocation sizes;

track memory allocations of memory;

identify a plurality of memory allocations that match at least portion of the pattern of memory allocations based at least in part on the tracking of the memory allocations, wherein sizes and an order of the plurality of memory allocations match at least a portion of the sequential ordering of memory allocation sizes in the pattern;

determining whether a memory allocation from the plurality of memory allocations comprises binary code unreadable by one or more computing devices; and perform a security action upon determining a quantity of the plurality of memory allocations satisfies a predetermined threshold and determining the memory allocation from the plurality of memory allocations comprises binary code unreadable by one or more computing devices.

19. The computer-program product of claim 1, wherein the instructions are executable processor to:

determine that a sequence of wiped data strings satisfies a confidence threshold, wherein identifying a plurality of memory allocations that match at least a portion of the pattern of memory allocations is based at least in part on determining that the number of wiped data strings satisfies the confidence threshold.

20. The computing device of claim 11, wherein tracking memory allocations further comprises tracking a sequential ordering of memory allocations of an application.

* * * * *